United States Patent
Yang et al.

(10) Patent No.: US 12,184,973 B2
(45) Date of Patent: Dec. 31, 2024

(54) METHODS FOR TRANSMITTING ASYNCHRONOUS EVENT DATA VIA SYNCHRONOUS COMMUNICATIONS INTERFACES, AND ASSOCIATED IMAGING SYSTEMS

(71) Applicant: OMNIVISION TECHNOLOGIES, INC., Santa Clara, CA (US)

(72) Inventors: Wenlei Yang, Shanghai (CN); Shoushun Chen, Shanghai (CN); Andreas Suess, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 120 days.

(21) Appl. No.: 18/177,668

(22) Filed: Mar. 2, 2023

(65) Prior Publication Data
US 2024/0298088 A1    Sep. 5, 2024

(51) Int. Cl.
*H04N 23/60*    (2023.01)
*H04N 25/707*    (2023.01)
*H04N 25/772*    (2023.01)

(52) U.S. Cl.
CPC ......... *H04N 23/665* (2023.01); *H04N 25/707* (2023.01); *H04N 25/772* (2023.01)

(58) Field of Classification Search
CPC ... H04N 23/665; H04N 25/707; H04N 25/772
See application file for complete search history.

(56) References Cited

U.S. PATENT DOCUMENTS 7,388,853 B2    6/2008   Ptasinski et al.
8,892,163 B2 *  11/2014  Tsau ................... G06F 1/325
                                              250/214 R (Continued)

FOREIGN PATENT DOCUMENTS

CN       115118895 A  *  9/2022   ............. H04N 25/42

OTHER PUBLICATIONS

T. Finateu et al., "A 1280x720 Back-Illuminated Stacked Temporal Contrast Event-Based Vision Sensor with 4.86um Pixels, 1.0666GEPS Readout, Programmable Event-Rate Controller and Compressive Data-Formatting Pipeline," ISSCC 2020, Session 5, Imagers and ToF Sensors, 5.10, pp. 112-114.

(Continued)

*Primary Examiner* — Nhan T Tran
(74) *Attorney, Agent, or Firm* — PERKINS COIE LLP

(57) ABSTRACT

Methods for transmitting asynchronous event data via synchronous communications interfaces (and associated imaging systems) are disclosed herein. In one embodiment, an imager comprises an array of event vision pixels, a synchronous communications transmitter configured to transmit frames of data to a synchronous communications receiver, and a timer configured to indicate when a threshold amount of time has elapsed. The pixels can generate event data based on activity within an external scene. The imager can be configured to insert available event data into a payload of the current frame during a first time period before the frame timer indicates that the threshold amount of time has elapsed, pad the payload with dummy data during a second time period after the frame timer indicates that the threshold amount of time has elapsed, and transmit (using the synchronous communications transmitter) the current frame of data to the synchronous communications receiver.

31 Claims, 5 Drawing Sheets

(56) References Cited

U.S. PATENT DOCUMENTS 11,563,909 B1 * 1/2023 Chen .................... H04N 25/701
2023/0403482 A1 * 12/2023 Miyazaki ............. H04N 25/707

OTHER PUBLICATIONS

B. Son et al., "A 640x480 Dynamic Vision Sensor with a 9um Pixel and 300Meps Address-Event Representation," ISSCC 2017, Session 4, Imagers, 4.1, pp. 66-68.
Sony, Event-Based Vision Sensor (EVS), "https://www.sony-semicon.com/en/products/is/industry/evs.html.," 5 pages.
"Specification for Camera Serial Interface 2 (CSI-2SM)," MIPI Alliance, May 31, 2019, 338 pages.
C. Li et al., "A 132 by 104 10μm-Pixel 250μW 1kefps Dynamic Vision Sensor with Pixel-Parallel Noise and Spatial Redundancy Suppression," 4 pages.

* cited by examiner

METHODS FOR TRANSMITTING ASYNCHRONOUS EVENT DATA VIA SYNCHRONOUS COMMUNICATIONS INTERFACES, AND ASSOCIATED IMAGING SYSTEMS

TECHNICAL FIELD

This disclosure relates generally to image sensors. For example, several embodiments of the present technology relate to methods for transmitting, via synchronous communications interfaces, asynchronous event data generated by event vision sensors.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified.

Figure 1:
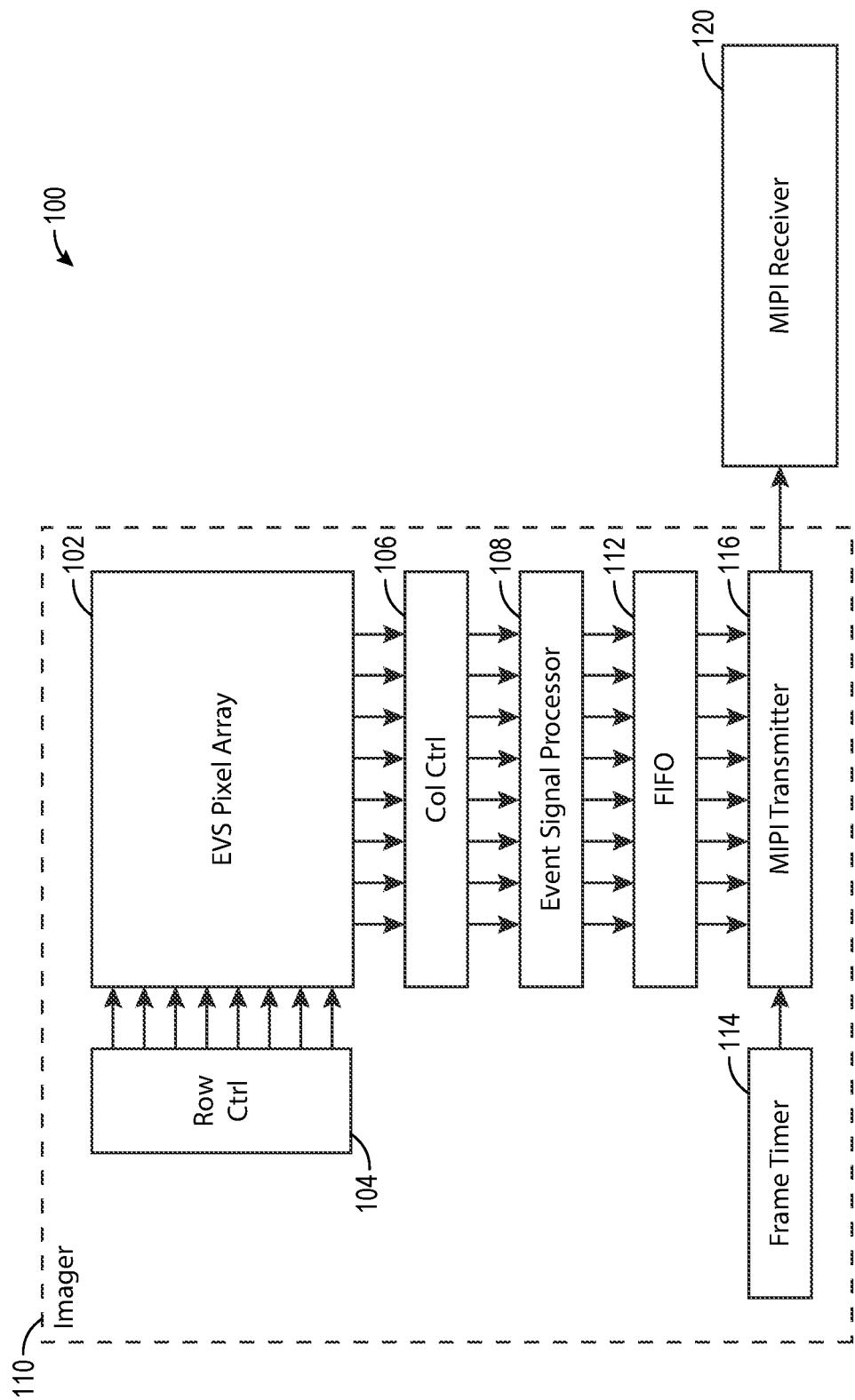
FIG. 1 is a partial schematic block diagram of an imaging system configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures or described in detail below to avoid unnecessarily obscuring the description of various aspects of the present technology.

DETAILED DESCRIPTION

The present disclosure relates to imaging systems including event vision sensors. For example, several embodiments of the present technology are directed to methods for transmitting, via synchronous communications interfaces, asynchronous event data generated by event vision sensors. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) that illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. OVERVIEW

Active pixel sensors (e.g., CMOS imaging systems) commonly employ an array of active pixels having an integration time that is globally defined. Thus, active pixels in an active pixel sensor typically have an identical integration time, and each pixel in the array is typically converted into a digital signal regardless of its content (e.g., regardless of whether there has been a change in an external scene that was captured by a pixel since the last time the pixel was read out). In other words, image data generated by active pixels in, for example, CMOS imagers are read out in frames of known size regardless of whether there are events in an external scene. Stated another way, the image data generated by active pixels is synchronously read out from the active pixels. Therefore, synchronous communications interfaces (e.g., mobile industry processor interfaces (MIPIs) governed by camera serial interface (CSI) communications protocols) are commonly used to read out or transmit synchronous image data from imagers incorporating active pixel sensors.

In comparison, event vision sensors (e.g., event driven sensors or dynamic vision sensors) read out a pixel and/or convert a corresponding pixel signal into a digital signal when the pixel captures a change (e.g., an event) in the external scene. In other words, pixels of an event vision sensor that do not detect a change in the external scene are not read out and/or pixel signals corresponding to such pixels are not converted into digital signals. Thus, each pixel of an event vision sensor can be independent from other pixels of the event vision sensor, and only pixels that detect a change in the external scene need be read out, and/or have their corresponding pixel signals converted into digital signals or recorded (thereby saving power). Stated another way, event data generated by event vision pixels can be asynchronously read out from the pixels and/or recorded whenever events are detected in an external scene.

Due to the asynchronous nature of event data generated by imagers employing event vision pixels, synchronous communications interfaces and protocols are typically not used to read out or transmit asynchronous event data from such imagers. Rather, such imagers typically employ custom asynchronous communications interfaces and protocols (e.g., address-event-representation (AER) interfaces/protocols) in combination with custom receivers (e.g., field-programmable gate arrays (FPGAs)) to read out or transmit the asynchronous event data. There are several reasons for why synchronous communications interfaces and protocols are not commonly employed with event vision sensors. Taking MIPIs as an example, a MIPI receiver (e.g., an application processor) typically (a) expects to receive a frame of event data of known size from a MIPI transmitter and (b) imposes timer restrictions for receiving the complete frame of event data from the MIPI transmitter. But the MIPI/CSI communications protocols that govern the interface typically do not require a fixed frame period for the MIPI transmitter to communicate a frame to the MIPI receiver. Thus, if (i) a MIPI transmitter is employed to transmit asynchronous event data out of an imager incorporating event vision sensors and (ii) the occurrence of events (e.g., the event rate) within an external scene detected by the imager is low, the imager may take an extensive period of time to generate enough event data to fill a frame having the known size that the MIPI receiver expects to receive. The excess latency in receipt of a full frame of event data at the MIPI receiver that is caused by the low event rate within the external scene can lead to timer overflow issues within the MIPI receiver that, in turn, can lead to the MIPI aborting the frame transmission, resulting in loss of any asynchronous event data that was included in the aborted frame.

To address these concerns, imagers incorporating event vision pixels and configured in accordance with several embodiments of the present technology employ (a) a synchronous communications transmitter (e.g., a MIPI transmitter) that is configured to transmit frames of data out of the imager to a synchronous communications receiver (e.g., a MIPI receiver), and (b) a frame timer configured to track when a threshold amount of time has elapsed (e.g., as measured from a start of a current frame of data or a beginning of a payload of the current frame). During a time period before the frame timer indicates that the threshold amount of time has elapsed, the imager can add event data (if any) generated by the imager into the payload of the current frame until either the payload is full (e.g., filled with an amount of event data that corresponds to an amount of data that the synchronous communications receiver expects to receive) or the frame timer indicates that the threshold amount of time has elapsed, whichever occurs first. In the event that the frame timer indicates that the threshold amount of time has elapsed before the imager is able to fully fill the payload of the current frame with event data, the imager can, during a time period after the frame timer indicates that the threshold amount of time has elapsed, (i) pad the payload of the current frame with dummy data and/or (ii) insert newly incoming event data (if any) into the payload, until the payload of the current frame includes an amount of data (event data and/or dummy data) that the synchronous communications interface expects to receive.

In some embodiments, the imager can send the current frame to the synchronous communications interface whenever the payload of the current frame is full (e.g., subject to minimum and/or maximum frame rates). Therefore, in the event that the imager generates enough event data to fill the payload of the current frame during the time period before the frame timer indicates that the threshold amount of time has elapsed, the imager can transmit the current frame to the synchronous communications receiver filled with event data and/or before the frame timer indicates that the threshold amount of time has elapsed. On the other hand, in the event that the imager does not generate enough event data to fill the payload of the current frame during the time period before the frame timer indicates that the threshold amount of time has elapsed, the imager can proceed to pad the payload with dummy data and/or newly incoming event data (if any) until the payload is full, and then transmit the current frame (filled with dummy data and/or event data) to the synchronous communications receiver. The threshold amount of time can be set (e.g., predetermined, preset, or programmed) at a value that enables the imager to (a) fully fill the payload of the current frame with dummy data and/or event data and (b) finish transmitting the current frame to the synchronous communications receiver (e.g., subject to a minimum frame rate) before timer overflow issues within the synchronous communications receiver 120 or other timing specification issues within the synchronous communications interface are likely to occur, thereby reducing the likelihood that the synchronous communications interface aborts transmission of the current frame. In this manner, the present technology facilitates asynchronously sending, via a synchronous communications interface and at timings that depend on the amount of activity in an external scene, event data to a synchronous communications receiver in frames of a known size, while avoiding many of the problems highlighted above with using a synchronous communications interface for transmitting asynchronous event data out of an imager.

B. Selected Embodiments of Imaging Systems and Associated Methods of Transmitting Asynchronous Event Data via Synchronous Communications Interfaces FIG. 1 is a partial schematic block diagram of an imaging system 100 configured in accordance with various embodiments of the present technology. As shown, the imaging system 100 includes an imager 110 and a synchronous communications receiver 120 ("the receiver 120"). The receiver 120 is shown as a MIPI receiver 120 in FIG. 1 as an example, and can be another suitable synchronous communications receiver in other embodiments.

The imager 110 includes an array 102 of event vision pixels, row control circuitry 104, column control circuitry 106, an event signal processor 108, a synchronous communications transmitter 116 ("the transmitter 116"), and a frame timer 114. The transmitter 116 is shown as a MIPI transmitter 116 in FIG. 1 as an example, and can be another suitable synchronous communications transmitter in other embodiments. In some embodiments, the imager 110 can additionally include a memory 112, as discussed in greater detail below. The memory 112 is shown as a FIFO buffer 112 in FIG. 1 as an example. In other embodiments, the memory 112 can be another suitable type of buffer or memory.

The array 102 of event vision pixels in the imager 110 includes a plurality of event vision pixels arranged in rows and columns. As discussed above, event vision pixels are configured to capture changes (e.g., events) in an external scene. To this end, each event vision pixel can include (i) a photosensor (not shown), such as a photodiode, configured to photogenerate charge or photocurrent in response to incident light received from the external scene; (ii) a photocurrent-to-voltage converter (not shown) coupled to the photosensor to convert photocurrent generated by the photosensor to a voltage; and (iii) a filter amplifier (not shown) coupled to the photocurrent-to-voltage converter to generate a filtered and amplified signal in response to the voltage received from the photocurrent-to-voltage converter. The event vision pixels can further include a threshold comparison circuit or stage (not shown) to generate and receive handshake signals in response to events asynchronously detected in incident light received from the external scene. Alternatively, a threshold comparison circuit may be included in circuitry (e.g., in the event signal processor 108) peripheral or external to the event vision pixels of the array 102, such as within column read out circuitry.

In operation, when an event occurs in an external scene, that event is indicated in the incident light received by one or more photosensors of one or more event vision pixels of the array 102. In particular, the event can be indicated as a quick or sudden change in intensity or brightness of the incident light. In other words, if the external scene is static and there is no event occurring, the brightness of the incident light remains substantially unchanged, meaning that photocurrent (generated by a photosensor of an event vision pixel that receives the incident light) remains substantially unchanged or constant. If an event (e.g., movement) occurs within the external scene, however, the event is indicated with an asynchronous quick or sudden change in brightness of the incident light. The change in brightness can be from darker to brighter or from brighter to darker, and can cause an asynchronous change or delta in photocurrent generated by a photosensor of an event vision pixel that received the incident light. The change or delta in the photocurrent can be (a) converted to a voltage by a photocurrent-to-voltage converter coupled to the photosensor, (b) filtered and amplified using a corresponding filter amplifier, and (c) detected with a threshold comparison circuit. In some embodiments, to detect the change or delta in the photocurrent, the threshold comparison circuit can compare the change or delta to a threshold value or amount, and detect events that occur in the external scene based on the comparison. For example, the threshold comparison circuit can detect that an event has occurred in the external scene when a magnitude of the change or delta exceeds a magnitude of a threshold value.

As discussed above, the imager 110 does not need to record an entire regular image, and therefore is not burdened with having to capture and record all of the highly redundant information of a normal image from frame to frame. Rather, in various embodiments, the imager 110 records only events. For example, the imager 110 can record the location of where an event is detected (e.g., the x-y coordinates of an event vision pixel in the array 102), the polarity of change (e.g., brighter or darker) in the photocurrent for that event, and/or a timing corresponding to when the event occurred or was detected. In other words, the imager 110 can be employed to detect movement or motion in an external scene (e.g., as opposed to being employed to capture/read out entire frames of images or video), thereby enabling use of a low data rate and a realization of ultra-high frame rates or speed capabilities in imagers of the present technology.

Event data detected by the event vision pixels of the array 102 can be read out from the array 102 asynchronously and/or may be read out in an order that differs from the order in which the event data was generated. In these embodiments, digital time stamps associated with each event occurrence in signals output from the event vision pixels can help to ensure that detected events are processed and/or reconstructed back into the correct order in which the events occurred.

With continuing reference to FIG. 1, the row control circuitry 104 and the column control circuitry 106 are used to control the rows and columns, respectively, of the event vision pixels in the array 102. For example, the row control circuitry 104 and/or the column control circuitry 106 can be configured to reset specific (e.g., individual ones or rows of) event vision pixels of the array 102, and/or to read out (e.g., individual ones or rows of) event vision pixels from the array 102 (e.g., along corresponding column bitlines connected to the event vision pixels).

Pixel signals read out from event vision pixels of the array 102 can be passed to the event signal processor 108 of the imager 110 for processing. Processing of the pixel signals performed by the event signal processor 108 can include removing pixel signals corresponding to defective event vision pixels of the array 102, classifying segments or shapes of the corresponding event data, and/or compressing the event data for transmission to the receiver 120 via the transmitter 116, among other functions.

After processing by the event signal processor 108 is complete, event data can be provided to the transmitter 116 for transmitting the event data out of the imager 110 to the receiver 120. Additionally, or alternatively, all or a subset of the event data can be stored in memory 112 (e.g., before or after being provided to the transmitter 116), as described in greater detail below. Although shown as being positioned between the event signal processor 108 and the transmitter 116, the memory 112 can be omitted or positioned at other locations within the imager 110 in other embodiments of the present technology. For example, the memory 112 can be positioned within (and therefore be a part of) the event signal processor 108 or the transmitter 116 in some embodiments, or can be positioned after the transmitter 116 (e.g., such that the transmitter 116 is positioned between the event signal processor 108 and the memory 112).

The frame timer 114 of the imager 110 is used to govern the timings of various operations of the imager 110 (e.g., of the event signal processor 108, of the transmitter 116, etc.). For example, the frame timer 114 can used to determine when a (e.g., predetermined, preset, or programmable) threshold amount of time has elapsed. As discussed in greater detail below with reference to FIGS. 2-5, the imager 110 (e.g., the event signal processor 108 and/or the transmitter 116) can be configured, in a time period before the threshold amount of time has elapsed, to add event data to a payload of a current frame of data to be sent to the receiver 120 from the transmitter 116. If the payload of the current frame is fully filled with event data before the threshold amount of time has elapsed (as determined using the frame timer 114), the transmitter 116 can send the current frame of event data to the receiver 120, the frame timer 114 can be reset, and the process can repeat for a next frame of data to be sent to the receiver 120 from the transmitter 116. Alternatively, if the payload of the current frame is not fully filled with event data before the threshold amount of time has elapsed (as determined by the frame timer 114), the imager 110 can be configured, during a time period after the threshold amount of time has elapsed, to fill whatever amount of the payload of the current frame remains unfilled with (a) dummy data and/or (b) newly generated or available event data that arrives after the threshold amount of time has elapsed. Once the payload of the current frame is full with event data and/or dummy data, the transmitter 116 can send the current frame to the receiver 120, the frame timer 114 can be reset, and the process can repeat for a next frame of data.

In some embodiments, the threshold amount of time can be set at a value that ensures that the imager 110 can, before timer overflow or other issues occur that would abort transmission of the frame, both (a) insert dummy data and/or event data into the payload of the current frame to fully fill the frame with data to a size expected by the receiver 120 once the threshold amount of time has elapsed and (b) finish transmitting the full frame of data to the receiver 120. In these and other embodiments, the transmitter 116 can be configured to send a current frame to the receiver 120 within a specified period of time. For example, the transmitter 116 can be configured to send frames to the receiver 120 in accordance with a specified (e.g., predetermined, preset, programmable, etc.) frame rate. As another example, the threshold amount of time discussed above can be a first threshold amount of time, and the transmitter 116 can be configured to send a current frame of data to the receiver 120 before or when a second threshold amount of time has elapsed (as tracked by the frame timer 114 or another timer (not shown) of the imager 110). The second threshold amount of time can correspond to a greater amount of time than the first threshold amount of time (as measured from a start of the first threshold amount of time), or can correspond to a (e.g., predetermine, preset, or programmable) amount of time after the first threshold amount of time has elapsed. Continuing with this example, an end of the first threshold amount of time can be set at a value relative to an end of the second threshold amount of time such that the imager 110 can fully fill a payload of a current frame with an amount of data of a size expected by the receiver 120 by padding unfilled portions of the payload with dummy data and/or event data (i) once the frame timer 114 indicates that the first threshold amount of time has elapsed and (ii) before the second threshold amount of time has elapsed. In some embodiments, the second threshold amount of time can correspond to an amount of time or transmission latency at or below which timer overflow issues within the receiver 120 or other timing specification issues within the synchronous communications interface are unlikely to occur. In other words, the second threshold amount of time can be set such that, as long as the transmitter 116 finishes sending a current frame that is fully filled with data to the receiver 120 before the second threshold amount of time has elapsed, there is little likelihood of the synchronous communications interface aborting the transmission (e.g., due to timer overflow issues within the receiver 120 or other timing specification issues within the synchronous communications interface), thereby reducing the likelihood of event data included in a payload of the current frame being lost.

In some embodiments, the imager 110 can be configured to transmit frames of data to the receiver 120 in accordance with a maximum frame rate and/or a minimum frame rate (e.g., to accommodate upper and/or lower bounds on frame-rate variability specified by the receiver 120). To this end, a maximum frame rate can be specified by defining a minimum frame time (representing the reciprocal of maximum frame rate). The minimum frame time can be specified by (a) defining a frame size (e.g., by programming a packet/line size and line count), (b) programming a data rate (e.g., in bits-per-second or symbols-per-second) of the transmitter 116, and/or (c) programming horizontal blanking ("Hblanking") and/or vertical blanking ("Vblanking") times. Continuing with this example, a specified minimum frame time can then be provided by the following equation:

$$\text{min frame time} = \frac{\text{frame size}}{\text{transmitter data rate}} + (\text{line count} * Hblanking) + Vblanking \quad \text{Equation 1}$$

Additionally, or alternatively, a minimum frame rate can be specified by defining a maximum frame time (representing the reciprocal of minimum frame rate). The maximum frame time can be specified by programming the threshold amount of time ("frame timer threshold") tracked by the frame timer 114. Then, the maximum frame time can be provided by the following equation:

$$\text{max frame time} = \text{frame timer threshold} + \text{min frame time} \quad \text{Equation 2}$$

Therefore, by increasing the frame size and reducing the frame timer threshold, the present technology can limit a difference between the maximum frame rate and the minimum frame rate at the expense of transmitting more dummy data (as opposed to event data) and, thus, excess power.

Figure 2:
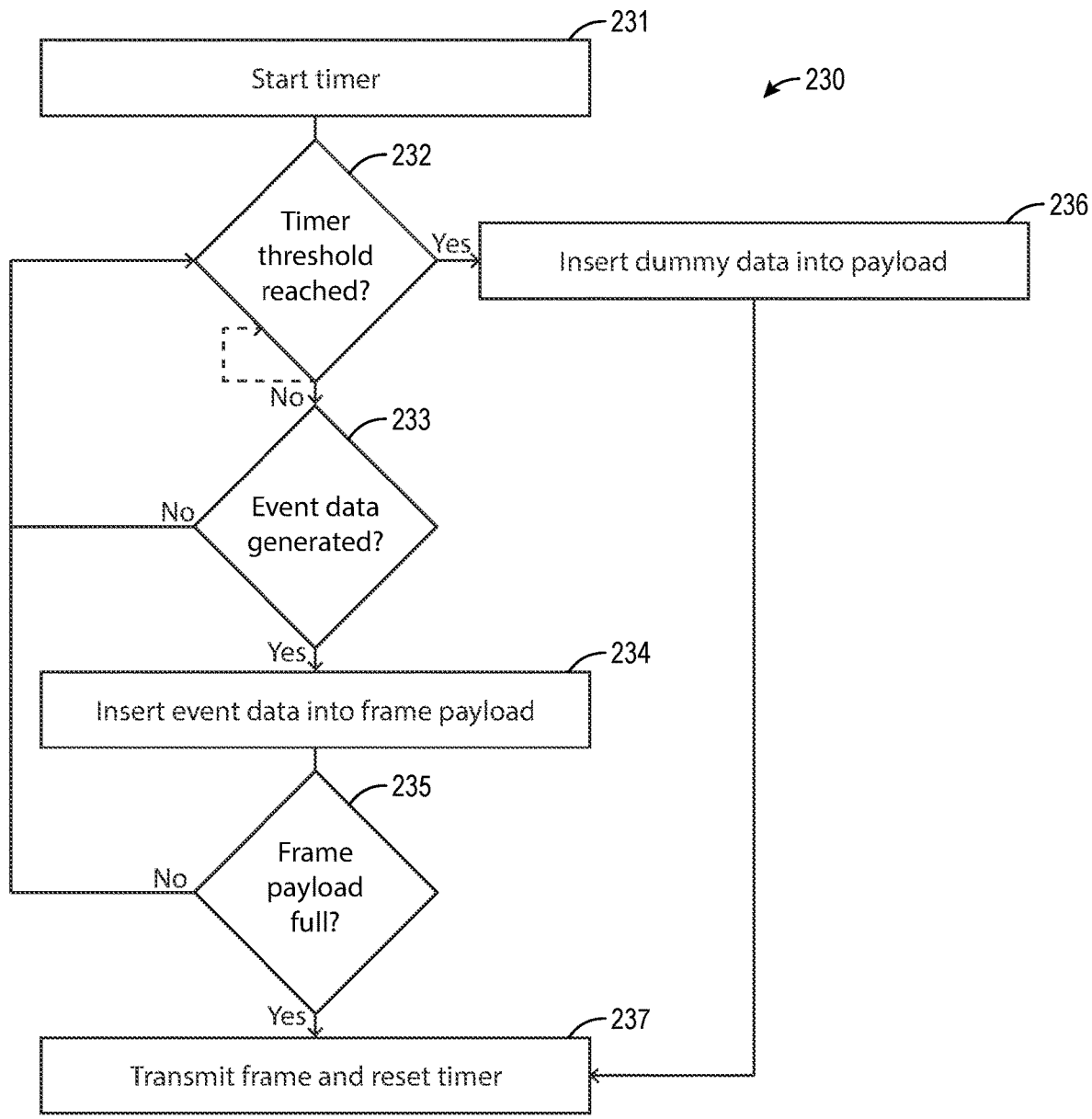
FIG. 2 is a flow diagram illustrating a method of operating the imaging system of FIG. 1 in accordance with various embodiments of the present technology.

FIG. 2 is a flow diagram illustrating a method 230 of operating the imaging system 100 of FIG. 1 in accordance with various embodiments of the present technology. The method 230 can be employed, for example, to transmit asynchronous event data from the imager 110 of the imaging system 100 via a synchronous communications interface formed at least in part by the transmitter 116 and the receiver 120. The method 230 is illustrated as a set of steps or blocks 231-237. All or a subset of one or more of the blocks 231-237 can be executed by various components of the imaging system 100. For example, all or a subset of one or more of the blocks 231-237 can be executed by (i) the array 102 of event vision pixels, (ii) the row control circuitry 104, (iii) the column control circuitry 106, (iv) the event signal processor 108, (v) the memory 112, (vi) the frame timer 114, and/or (vii) the transmitter 116. Furthermore, any one or more of the blocks 231-237 can be executed in accordance with the discussion of FIG. 1 above. The method 230 of FIG. 2 is discussed below with occasional reference to FIG. 3 that is a timing diagram illustrating a transmission of a first frame (frame i) and a second frame (frame i+1) of data, such as from the transmitter 116 of the imager 110 of FIG. 1 to the receiver 120 of FIG. 1.

Figure 3:
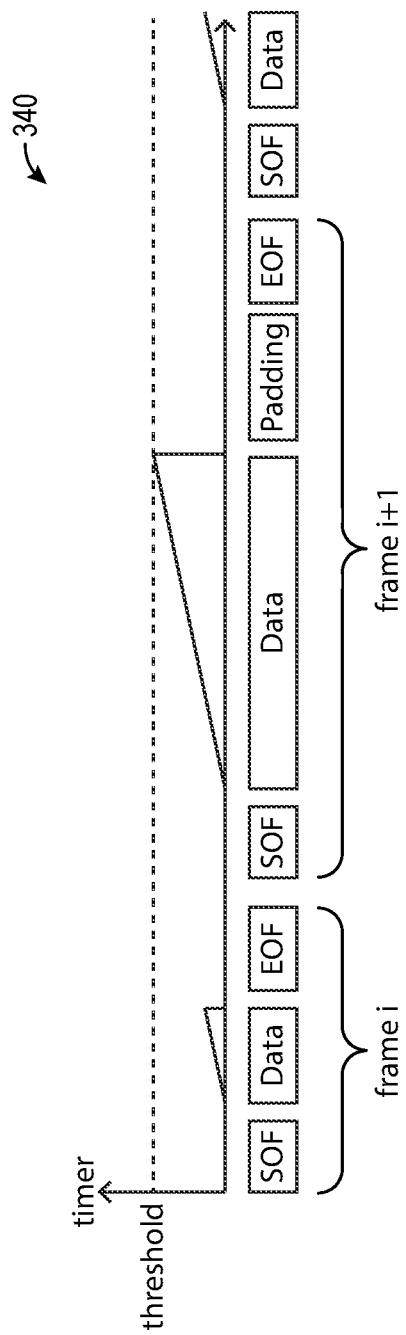
FIG. 3 is a timing diagram illustrating an example of the method of FIG. 2.

The method 230 of FIG. 2 begins at block 231 by starting the frame timer 114. As discussed above, imager 110 can use the frame timer 114 for determining when a threshold amount of time has elapsed. In some embodiments, the frame timer 114 can begin at zero or another default/reset value and count up (e.g., toward the threshold amount of time). In other embodiments, the frame timer 114 can begin at the threshold amount of time or another default/reset value and count down (e.g., toward zero or another value indicating that the threshold amount of time has elapsed). The frame timer 114 can be started with (e.g., at the beginning of, end of, or another location along) a start-of-frame (SOF) symbol or header of a frame. Alternatively, as is shown in FIG. 3, the imager 110 can start the frame timer 114 with (e.g., at the beginning of, or another location along) a data packet or payload of a frame. In the embodiment illustrated in FIG. 3, the frame timer 114 is configured to count up from zero toward the threshold amount of time.

At block 232 of FIG. 2, the method 230 continues by determining whether an amount of time equivalent to the threshold amount of time has elapsed since the frame timer 114 was started at block 231. When the imager 110 determines that the threshold amount of time has elapsed (block 232: Yes), the method 230 proceeds to block 236. On the other hand, when the imager 110 determines that the threshold amount of time has not elapsed (block 232: No), the method 230 proceeds to block 233. In some embodiments, the imager 110 continually or periodically checks whether the threshold amount of time has elapsed while also proceeding to block 233 (as is shown by the arrow returning to block 232 in FIG. 2).

At block 233, the method 230 continues by determining whether event data has been generated and/or is available for transmission to the receiver 120. In some embodiments, the imager 110 can determine that event data has been generated or is available for transmission to the receiver 120 (block 233: Yes) when the imager 110 determines that there is event data that (1) has been (a) generated by one or more event vision pixels of the array 102, (b) read out from the array 102, (c) processed by the event signal processor 108, (d) received by the transmitter 116, and/or (e) stored to the memory 112, and (2) has not already been added to the payload of a current frame to be sent to the receiver 120. In some embodiments, the imager 110 is configured, during a period of time before the frame timer 114 indicates that the threshold amount of time has elapsed (block 232: No), to insert only event data (e.g., as opposed to dummy data). Thus, when no event data has been generated and/or is available for transmission to the receiver 120 (block 232: No). Thus, when the imager 110 determines that no event data has been generated or is available (block 233: No), the method 230 can, without inserting event data or other data into the payload of a current frame, return to block 232 to determine whether the amount of time equivalent to the threshold amount of time has elapsed. On the other hand, when the imager 110 determines that event data has been generated or is available (block 233: Yes), the method 230 can proceed to block 234.

As discussed above, event data is asynchronously generated by the event vision pixels of the array 102 dependent on activity or the occurrence of events in an external scene. Thus, the amount of event data generated can be positively correlated with the event rate or amount of activity in the external scene. In other words, a large amount of event data can be generated when a large amount of activity occurs in the external scene, and little to no event data can be generated when little or no activity occurs in the external scene. Event data (if any) generated by event vision pixels of the imager 110 can be read out from the array 102 and processed by the event signal processor 108.

At block 234, the method 230 continues by inserting event data into the payload of the current frame. When a large amount of event data has been generated and is available for insertion into the payload of the current frame, the imager 110 is able to quickly fill the payload of the current frame. On the other hand, when little to no event data has been generated and is available for insertion into the payload of the current frame, the imager 110 is unable to quickly fill the payload of the current frame to the size expected by the receiver 120 and, instead, must often wait for additional event data to arrive before the imager 110 is able to fully fill the payload. In some embodiments, the method 230 can proceed from block 234 to block 235 (a) after the imager 110 inserts a predetermined, preset, or programmable amount of event data into the payload of the current frame, and/or (b) when all currently available event data has been added to the payload of the current frame.

At block 235, the method 230 continues by determining whether the payload of the current frame is full (also referred to herein as "fully filled"). The imager 110 can determine that a payload of the current frame is fully filled at block 235 when the payload of the current frame is filled with an amount of data (here, event data) that the receiver 120 expects to receive from the transmitter 116. In some embodiments, all or a subset of block 235 can be performed during block 234. For example, while the imager 110 adds event data into the payload of the current frame or after the imager 110 adds a predetermined, preset, or programmable amount of event data into the payload, the imager 110 can determine whether the addition of the event data at block 234 has fully filled the payload of the current frame. When the imager 110 determines that the payload of the current frame is not full (block 235: No), the method 230 can continue adding event data to the payload at block 234 at least until the frame timer 114 indicates the threshold amount of time has elapsed (block 232: Yes). Additionally, or alternatively, all or a subset of block 235 can be performed after block 234. For example, the imager 110 can determine whether the payload of the current frame is full after the imager 110 inserts all currently generated and/or available event data into the payload. In this case, when the imager 110 determines that the payload of the current frame is not full (block 235: No), the method 230 can return to block 232 to determine whether an amount of time equivalent to the threshold amount of time has elapsed. Regardless of whether block 235 is performed during or after block 234, the method 230 can proceed to block 237 when the imager 110 determines that the payload of the current frame is full (block 235: Yes).

At block 237, the method 230 continues by transmitting the current frame to the receiver 120 and resetting the frame timer 114. The imager 110 can transmit the current frame to the receiver 120 using the transmitter 116. In addition, the imager 110 can reset the frame timer 114 (a) with (e.g., at the end of) the payload symbol of the current frame, (b) when the frame timer 114 reaches the threshold amount of time, (c) with (e.g., at the beginning of, end of, another location along) an end-of-frame (EOF) symbol of the current frame, (d) upon or after transmission of the current frame from the transmitter 116 to the receiver 120, or (e) at another suitable point within the method 230 of FIG. 2.

Returning to block 232 of the method 230, when the imager 110 determines (e.g., using the frame timer 114) that the threshold amount of time has elapsed (block 232: Yes), the method 230 proceeds to block 236 to insert dummy data into unfilled portions of the payload of the current frame until the payload of the current frame is full (e.g., filled with an amount of data (here, dummy data and/or event data) that the receiver 120 expects to receive from the transmitter 116). In the event that the imager 110 does not insert any event data into the payload of the current frame before the frame timer 114 reaches the threshold amount of time, the payload of the current frame can be entirely filled with dummy data. Alternatively, in the event that (i) the imager 110 inserts event data into the payload of the current frame before the frame timer 114 reaches the threshold amount of time and (ii) the event data inserted into the payload does not fully fill the payload, the payload of the current frame sent to the receiver 120 can be partially filled (e.g., padded) with dummy data and partially filled with the event data.

In some embodiments, the dummy data is encoded differently from event data so that the dummy data can be later distinguished from event data (e.g., at the receiver 120). For example, the dummy data can include (i) a unique header or (ii) a header encoded in a unique format. The unique header or the unique header encoding format used for dummy data can be different from a header or a header encoding format, respectively, that is/are used to identify event data.

After padding dummy data into the payload of the current frame to fully fill the payload, the method 230 can proceed to block 237 to transmit the current frame to the receiver 120 and reset the frame timer 114 in accordance with the discussion of block 237 above.

Referring now to FIG. 3 as an example of the method 230 of FIG. 2, the imager 110 starts the frame timer 114 (block 231) at the beginning of a data payload of a first frame (frame i). For the first frame, a large amount of activity occurs within the external scene, meaning that a large amount of event data is generated by the imager 110 and available for insertion into the payload of the first frame (block 233: Yes). As such, the imager 110 is able to fully fill the payload of the first frame (block 234) quickly and well before the frame timer 114 reaches the threshold amount of time. Thus, the imager 110 is able to finish transmitting the first frame of event data to the receiver 120 (block 237) before the frame timer 114 reaches the threshold amount of time.

With continuing reference to FIG. 3, the imager 110 proceeds to fill a second frame (frame i+1) after resetting the frame timer 114. In particular, the imager 110 starts the frame timer 114 (block 231) at the beginning of a data payload of the second frame. In contrast to the first frame, a small amount of activity occurs within the external scene for the second frame, meaning that little to no event data is generated by the imager 110 and available for insertion into the payload of the second frame. As a result, the frame timer 114 reaches the threshold amount of time (block 232: Yes) before the imager 110 is able to fully fill the payload of the second frame with event data. Thus, upon the frame timer 114 reaching the threshold amount of time (block 232: Yes), the imager 110 proceeds to pad the payload of the second frame with dummy data (block 236) by filling unfilled portions of the payload of the second frame with the dummy data (as shown by the Padding symbol illustrated in FIG. 3) until the payload of the second frame is full (e.g., includes a total amount of dummy data and/or event data corresponding to a size expected by the receiver 120). At that point, the imager 110 proceeds to transmit the second frame to the receiver 120 (block 237) and resets the frame timer 114.

Note from FIG. 3 that the imager 110 can transmit the second frame (frame i+1) to the receiver 120 at a timing that is different from the timing at which the imager 110 transmits the first frame (frame i) to the receiver 120. In particular, for the first frame, the abundance of event data available for insertion into the payload of the first frame enabled the imager 110 to (i) fully fill the payload of the first frame with event data and (ii) finish transmitting the first frame to the receiver 120, before the frame timer 114 reached the threshold amount of time. For the second frame, however, the lack of event data available for insertion into the payload of the second frame in the time period before the frame timer 114 reached the threshold amount of time hindered the imager 110 from fully filling the payload of the second frame with event data before the frame timer 114 reached the threshold amount of time. As a result, the imager 110 proceeded to (i) insert dummy data into the payload of the second frame after the threshold amount of time had elapsed and (ii) then transmit the second frame to the receiver 120. Thus, the present technology facilitates the imager 110 asynchronously sending, at timings that depend on the amount of activity in the external scene, event data to the receiver 120 in frames of a known size via a synchronous communications interface.

In other embodiments, the imager 110 can be configured to transmit the first frame (frame i) and the second frame (frame i+1) of FIG. 3 at a same timing relative to the frame timer 114 or another timer of the imager (e.g., in accordance with a set frame rate). For example, although the imager 110 is able to quickly fill the payload of the first frame shown in FIG. 3, the imager 110 can wait to finish transmitting the first frame to the receiver 120 until a specified timing that is consistent across both the first frame and the second frame.

Although the blocks 231-237 of the method 230 are discussed and illustrated in a particular order, the method 230 illustrated in FIG. 2 is not so limited. In other embodiments, the method 230 can be performed in a different order. In these and other embodiments, any of the blocks 231-237 of the method 230 can be performed before, during, and/or after any of the other blocks 231-237 of the method 230. For example, block 233 can be performed before block 232 in some embodiments. As another example, blocks 232, 233, and/or 235 can be performed during any one or more of blocks 232, 233, 234, 235, and/or 236. Moreover, a person of ordinary skill in the relevant art will recognize that the illustrated method 230 can be altered and still remain within these and other embodiments of the present technology. For example, one or more blocks 231-237 of the method 230 can be omitted and/or repeated in some embodiments. As another example, the imager 110 can be configured, during the time period before the frame timer 114 indicates that the threshold amount of time has elapsed (block 232: No), to insert dummy data into the payload of a current frame (at block 234) when no event data is generated and/or available for insertion into the payload.

As shown in FIG. 2 and discussed in detail above, the imager 110 pads a payload of a current frame with dummy data (block 236) when the frame timer 114 indicates that the threshold amount of time has elapsed (block 232: Yes). In some embodiments, once the frame timer 114 reaches the threshold amount of time (block 232: Yes), the imager 110 can be configured to insert only dummy data into the unfilled portions of the payload of the current frame regardless of whether newly generated/available event data arrives while the imager 110 is padding the payload with dummy data. In these embodiments, the imager 110 can store the newly generated/available event data in memory 112 and/or can transmit the newly generated/available event data to the receiver 120 in a future (e.g., a next, another) frame. Alternatively, the imager 110 can simply discard any newly generated/available event data that arrives while the imager 110 is padding the payload of the current frame with dummy data.

In other embodiments, when newly generated/available event data arrives while the imager 110 is padding a payload of a current frame with dummy data, the imager 110 can pause padding the payload with dummy data and insert the newly generated/available event data into the payload. In the event that the imager 110 is able to fully fill the payload with the newly generated/available event data, the imager 110 can proceed to finish transmitting the current frame to the receiver 120. On the other hand, in the event that the imager 110 is unable to fully fill the payload with the newly generated/available event data, the imager 110 can resume padding the payload with dummy data until additional event data arrives or until the payload of the current frame is full. Thus, in these embodiments, once the frame timer 114 indicates that the threshold amount of time has elapsed, the imager 110 can be configured to interleave newly generated/available event data with dummy data into the payload of a current frame until the payload is full.

Figure 4:
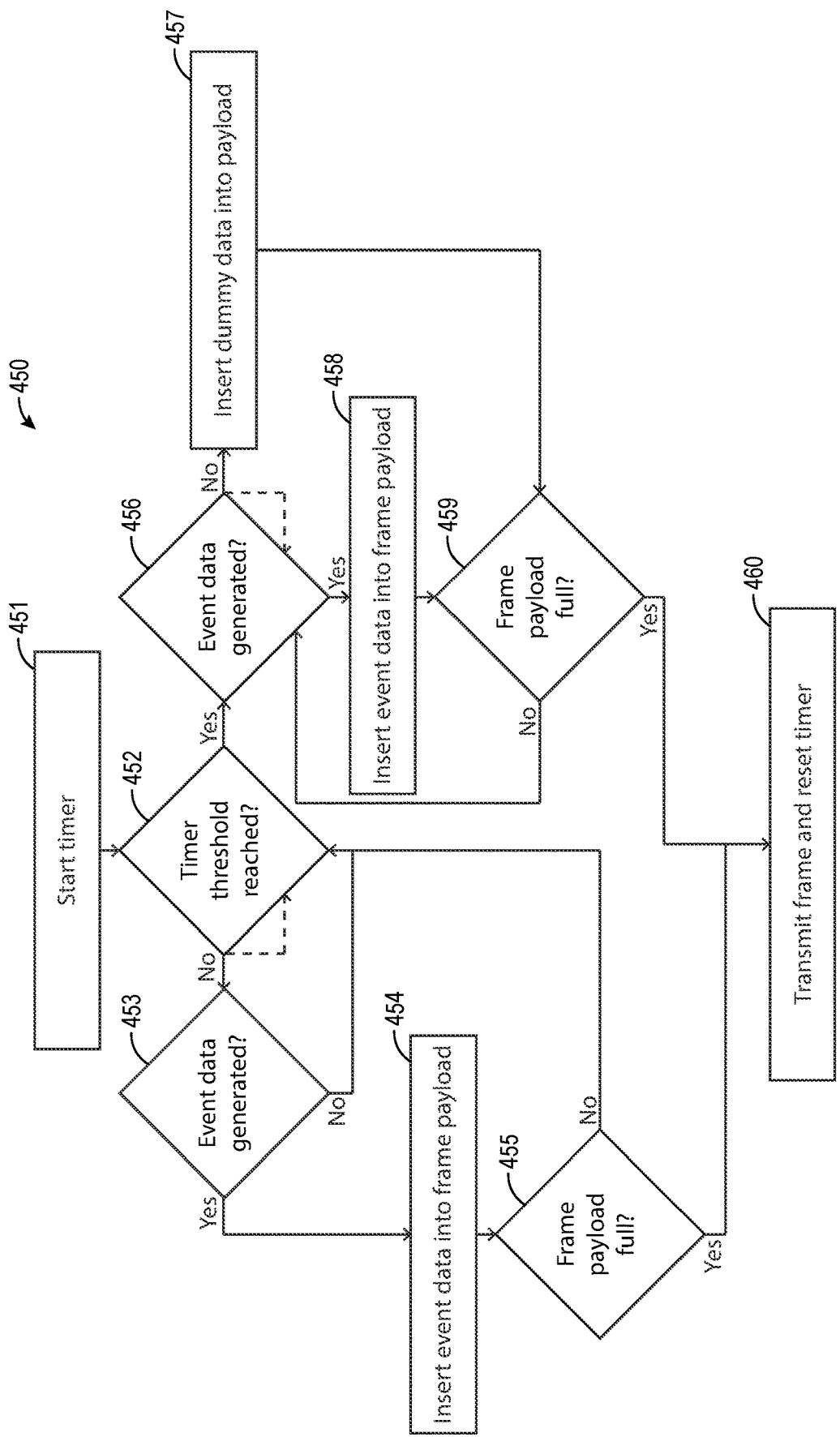
FIG. 4 is a flow diagram illustrating another method of operating the imaging system of FIG. 1 in accordance with various embodiments of the present technology.

FIG. 4 illustrates an example of this process. More specifically, FIG. 4 is a flow diagram illustrating a method 450 of operating the imaging system 100 of FIG. 1 in accordance with various embodiments of the present technology. The method 450 is illustrated as a set of steps or blocks 451-460. All or a subset of one or more of the blocks 451-460 can be executed by various components of the imaging system 100. For example, all or a subset of one or more of the blocks 451-460 can be executed by (i) the array 102 of event vision pixels, (ii) the row control circuitry 104, (iii) the column control circuitry 106, (iv) the event signal processor 108, (v) the memory 112, (vi) the frame timer 114, and/or (vii) the transmitter 116. Furthermore, any one or more of the blocks 451-460 can be executed in accordance with the discussion of FIGS. 1-3 above. The method 450 of FIG. 4 is discussed below with occasional reference to FIG. 5 that, like FIG. 3, is a timing diagram illustrating the transmission of a first frame (frame i) and a second frame (frame i+1) of data, such as from the transmitter 116 of the imager 110 of FIG. 1 to the receiver 120 of FIG. 1.

Similar to the method 230 of FIG. 2, the method 450 of FIG. 4 can be employed, for example, to transmit asynchronous event data from the imager 110 of the imaging system 100 via a synchronous communications interface. Indeed, blocks 451-455 of the method 450 are generally similar to blocks 231-235 of the method 230. Therefore, a detailed discussion of block 451-455 is largely omitted here for the sake of brevity.

Referring to block 452 of the method 450, when the frame timer 114 of the imager 110 indicates that the threshold amount of time has elapsed (block 452: Yes), the method proceeds to block 456 to determine whether there is any event data that is available for insertion into a payload of a current frame. When the imager 110 determines that there is no event data that is available for insertion into the payload (block 456: No), the method 450 proceeds to block 457 to pad the payload with dummy data by inserting dummy data into unfilled portions of the payload. In some embodiments, the imager 110 can, while inserting dummy data into the payload at block 457, continuously or periodically check whether there is any event data that is available for insertion into the payload (block 456). Absent the arrival of newly generated/available event data, the imager 110 can continue to pad the payload of the current frame with dummy data until the payload is full (block 459: Yes), at which point the imager 110 can proceed to block 460 to finish transmitting the current frame to the receiver 120 and reset the timer 114.

Referring again to block 456 of the method 450, when the imager 110 determines that there is event data available for insertion into the payload of the current frame (block 456: Yes), the method 450 can proceed to block 458 to insert the available event data into the payload. In the event that the imager 110 determines that there is event data available for insertion into the payload (block 456: Yes) while the imager 110 is inserting dummy data into the payload (block 457) and before the payload is full, the imager 110 can pause inserting the dummy data into the payload and begin inserting the available event data into the payload (block 458). In some embodiments, before pausing the insertion of dummy data into the payload, the imager 110 can finishing inserting dummy data words into the payload that the imager 110 is already in progress of inserting or transmitting (e.g., without interrupting or breaking those dummy data words). After pausing the insertion of dummy data into the payload of the current frame, the imager 110 can insert available event data into the payload in a manner generally consistent with the discussion of block 234 of the method 230 of FIG. 2 above.

In the event that the imager 110 is able to fully fill the payload of the current frame with the available event data (block 459: Yes), the imager 110 can proceed to block 460 to finish transmitting the frame to the receiver 120 and reset the frame timer 114. On the other hand, in the event that the imager 110 is unable to fully fill the payload of the current frame with the available event data (block 459: No), the method 450 can return to block 456 or block 457, at which the imager 110 can resume padding the payload with dummy data. The imager 110 can continue padding the payload of the current frame with dummy data (a) until a next arrival of newly generated/available event data or (b) until the payload of the current frame is full, whichever occurs first. In the event that newly generated/available event data arrives before the payload of the current frame is full, the imager 110 can again pause padding the payload with dummy data in favor of inserting the newly generated/available event imager data, and the process discussed above with reference to blocks 456-459 can repeat.

Figure 5:
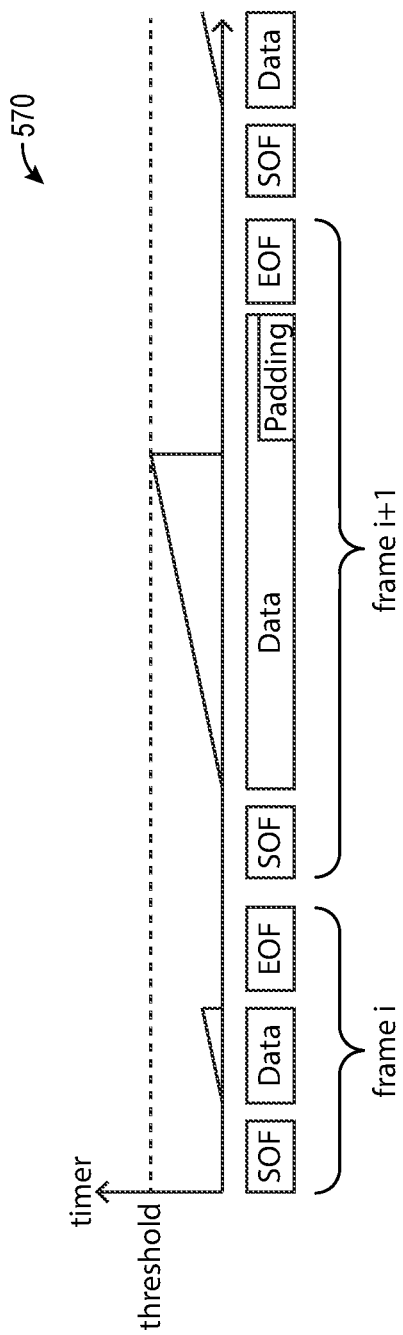
FIG. 5 is a timing diagram illustrating an example of the method of FIG. 4.

Therefore, once the frame timer 114 indicates that the threshold amount of time has elapsed, the imager 110 can (a) fill unfilled portions of a payload of a current frame entirely with dummy data (assuming that no newly generated/available event data arrives after the frame timer 114 reaches the threshold amount of time), (b) fill the unfilled portions of the payload entirely with event data (assuming that enough event data is available for insertion to fully fill the payload upon the frame timer 114 reaching the threshold amount of time), or (c) fill the unfilled portions of the payload with a combination of event imager data and dummy data (favoring event data whenever event data arrives, at least until the current frame is full). An example of this is shown in FIG. 5 by the overlap of the Data and Padding symbols in the second frame (frame i+1) after the frame timer 114 reaches the threshold amount of time. (The remainder of FIG. 5 is generally similar to the timing diagram illustrated in FIG. 3.)

By inserting newly arriving event data into a payload of a current frame after the frame timer 114 reaches the threshold amount of time and before the payload is full, the present technology enables use of a smaller sized memory 112 (or omission of the memory 112 altogether) without a significant risk of losing event data.

Although the blocks 451-460 of the method 450 are discussed and illustrated in a particular order, the method 450 illustrated in FIG. 4 is not so limited. In other embodiments, the method 450 can be performed in a different order. In these and other embodiments, any of the blocks 451-460 of the method 450 can be performed before, during, and/or after any of the other blocks 451-467 of the method 450. For example, block 457 can be performed before and/or during block 456 in some embodiments. As another example, blocks 456 and/or 459 can be performed during any one or more of blocks 456, 457, 458, and/or 459. Moreover, a person of ordinary skill in the relevant art will recognize that the illustrated method 450 can be altered and still remain within these and other embodiments of the present technology. For example, one or more blocks 451-460 of the method 450 can be omitted and/or repeated in some embodiments.

C. CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An imager, comprising:
   an array of event vision pixels, each pixel of the array configured to generate event data based at least in part on events indicated in incident light received from an external scene;
   a synchronous communications transmitter configured to transmit frames of data to a synchronous communications receiver; and
   a frame timer configured to indicate when a threshold amount of time has elapsed, the threshold amount of time corresponding to transmission of a current frame of data from the synchronous is communications transmitter to the synchronous communications receiver,
   wherein the imager is configured to:
      during a first time period after a start of the frame timer and before the frame timer indicates that the threshold amount of time has elapsed, insert available event data into a payload of the current frame,
      during a second time period after the frame timer indicates that the threshold amount of time has elapsed, pad the payload with dummy data, and
      transmit, using the synchronous communications transmitter, the current frame of data to the synchronous communications receiver.

2. The imager of claim 1, wherein the imager is configured, in response to determining that the payload of the current frame includes an amount of data expected by the synchronous communications receiver, to transmit the current frame of data to the synchronous communications receiver.

3. The imager of claim 2, wherein the imager is configured, in response to determining that the payload of the current frame includes the amount of data during the first time period, to transmit the current frame of data to the synchronous communications receiver during the first time period.

4. The imager of claim 3, wherein the imager is configured to transmit the current frame of data to the synchronous communications receiver in accordance with a specified maximum frame rate.

5. The imager of claim 2, wherein the imager is configured, in response to determining that the payload of the current frame includes the amount of data during the second time period, to transmit the current frame of data to the synchronous communications receiver in accordance with a specified minimum frame rate.

6. The imager of claim 1, wherein the imager is configured, after the frame timer indicates that the threshold amount of time has elapsed, to insert only the dummy data into the payload of the current frame.

7. The imager of claim 6, wherein:
the imager further comprises a memory; and
the imager is configured, after the frame timer indicates that the threshold amount of time has elapsed, to store newly available event data in the memory for transmission to the synchronous communications receiver in another frame of data.

8. The imager of claim 6, wherein the imager is configured, after the frame timer indicates that the threshold amount of time has elapsed, to discard newly available event data that arrives (i) after the frame timer indicates that the threshold amount of time has elapsed and (ii) before the imager transmits the current frame of data to the synchronous communications receiver.

9. The imager of claim 1, wherein the imager is configured, after the frame timer indicates that the threshold amount of time has elapsed and in response to arrival of newly available event data before the imager transmits the current frame of data to the synchronous communications receiver, to (a) pause padding of the payload with the dummy data and (b) insert at least a portion of the newly available event data into the payload of the current frame of data.

10. The imager of claim 9, wherein the imager is further configured, after pausing the padding of the payload with the dummy data and after inserting at least the portion of the newly available event data into the payload, to resume the padding of the payload with the dummy data.

11. The imager of claim 1, further comprising a memory configured to store at least a portion of the event data generated by the array of event vision pixels.

12. The imager of claim 11, wherein the memory includes a first-in-first-out (FIFO) buffer.

13. The imager of claim 1, wherein the imager is configured to encode the dummy data differently from the event data such that the event data can be distinguished from the dummy data at the synchronous communications receiver.

14. The imager of claim 1, wherein the imager is configured to start the frame timer with a start-of-frame symbol of the current frame of data.

15. The imager of claim 1, wherein the imager is configured to start the frame timer at a beginning of the payload of the current frame.

16. The imager of claim 1, wherein the synchronous communications transmitter includes a mobile industry processor interfaces (MIPI) transmitter.

17. An imaging system, comprising:
a synchronous communications receiver; and
an imager including a synchronous communications transmitter (a) operably connected to the synchronous communications receiver via a synchronous communications interface and (b) configured to transmit frames of data to the synchronous communications receiver via the synchronous communications interface, the imager further including:
an array of event vision pixels, each pixel of the array configured to generate event data based at least in part on events indicated in incident light received from an external scene, and
a timer usable to track when a threshold amount of time has elapsed, the threshold amount of time corresponding to transmission of a current frame of data from the synchronous communications transmitter to the synchronous communications receiver,
wherein the imager is configured to:
during a first period of time after a start of the timer and before the timer indicates that the threshold amount of time has elapsed, insert first event data into a payload of the current frame at least when an amount of the event data generated by one or more event vision pixels of the array is available for insertion into the payload,
during a second period of time after the timer indicates that the threshold amount of time has elapsed, insert dummy data into the payload of the current frame at least when no amount of the event data generated by the one or more event vision pixels is available for insertion into the payload, and
transmit, using the synchronous communications transmitter, the current frame of data to the synchronous communications receiver.

18. The imaging system of claim 17, wherein the synchronous communications receiver includes a mobile industry processor interfaces (MIPI) receiver.

19. The imaging system of claim 17, wherein the synchronous communications transmitter includes a mobile industry processor interfaces (MIPI) transmitter.

20. The imaging system of claim 17, wherein the imager further comprises a memory configured to store at least a portion of the event data generated by the event vision pixels of the array.

21. The imaging system of claim 20, wherein the memory includes a first-in-first-out (FIFO) buffer.

22. A method of operating an imager including one or more event vision pixels, the method comprising:
starting a timer associated with a transmission of a current frame of data to a synchronous communications receiver via a synchronous communications interface, wherein the timer indicates when a predetermined threshold amount of time has elapsed after the timer is started;
during a first period of time after starting the timer and before the timer indicates that the threshold amount of time has elapsed:
determining whether an amount of event data is available for insertion into a payload of the current frame of data, wherein the event data is generated by at least a subset of the one or more event vision pixels, and
when the amount of the event data is available for insertion, inserting at least a portion of the amount of the event data into a payload of the current frame;
during a second period of time after the timer indicates that the threshold amount of time has elapsed, inserting dummy data into the payload of the current frame at least when no amount of the event data is available for insertion into the payload of the current frame; and
transmitting, via the synchronous communications interface, the current frame of data to the synchronous communications receiver.

23. The method of claim 22, wherein:
the method further comprises determining that the payload includes a predetermined amount of data expected by the synchronous communications receiver; and
transmitting the current frame of data includes transmitting the current frame of data to the synchronous communications receiver in response to the determination that the payload includes the predetermined amount of data.

24. The method of claim 22, wherein:
the timer is a first timer; and
the method further comprises:
   starting a second timer associated with a transmission of another frame of data to the synchronous communications receiver via the synchronous communications interface, wherein the second timer indicates when the predetermined threshold amount of time has elapsed after the second timer is started,
   inserting, during a third period of time after starting the second timer and before the second timer indicates that the threshold amount of time has elapsed, a second amount of the event data generated by at least a second subset of the one or more event vision pixels into a payload of the other frame, and
   transmitting, during the third period of time, the other frame of data to the synchronous communications receiver.

25. The method of claim 22, wherein:
the timer is a first timer;
starting the first timer includes starting the first timer at a first time;
transmitting the current frame of data includes transmitting the current frame of data to the synchronous communications receiver at a first timing relative to the first time;
the method further comprises:
   starting a second timer at a second time, the second timer associated with a transmission of another frame of data to the synchronous communications receiver via the synchronous communications interface, wherein the second timer indicated when the predetermined threshold amount of time has elapsed after the second time, and
   transmitting the other frame of data to the synchronous communications receiver at a second timing relative to the second time; and
the second timing differs from the first timing.

26. The method of claim 22, wherein transmitting the current frame of data includes transmitting the current frame of data to the synchronous communications receiver (a) after the timer indicates that the threshold amount of time has elapsed and (b) in accordance with a minimum frame rate.

27. The method of claim 22, wherein:
the second period of time starts when the timer indicates that the threshold amount of time has elapsed, and ends when the current frame of data is transmitted to the synchronous communications receiver; and
inserting the dummy data into the payload of the current frame includes inserting only the dummy data into the payload of the current frame during the second period of time.

28. The method of claim 27, further comprising, during the second period of time, storing at least a second portion of the event data in memory for transmission to the synchronous communications receiver in another frame of data, wherein the second portion includes event data that is or becomes available for insertion into the payload of the current frame during the second period of time.

29. The method of claim 22, further comprising:
determining, during the second period of time, that a second amount of the event data is available for insertion into the payload of the current frame;
pausing, during the second period of time and in response to determining that the second amount of the event data is available, the insertion of the dummy data into the payload; and
inserting at least a portion of the second amount of the event data into the payload of the current frame.

30. The method of claim 29, further comprising:
determining, after the insertion of at least the portion of the second amount of the event data into the payload of the current frame, that a total amount of data inserted into the payload of the current frame is less than a predetermined amount of data expected by the synchronous communications receiver; and
in response to determining that the total amount of data is less than the predetermined amount of data expected by the synchronous communications receiver, resuming the insertion of the dummy data into the payload of the current frame.

31. The method of claim 22, wherein inserting the dummy data into the payload of the current frame includes encoding the dummy data such that the dummy data is distinguishable from the event data at the synchronous communications receiver.

* * * * *